Dec. 21, 1965  M. L. BARRETT, JR  3,224,247
PROVING FLOWMETERS
Filed Aug. 11, 1961  2 Sheets-Sheet 1
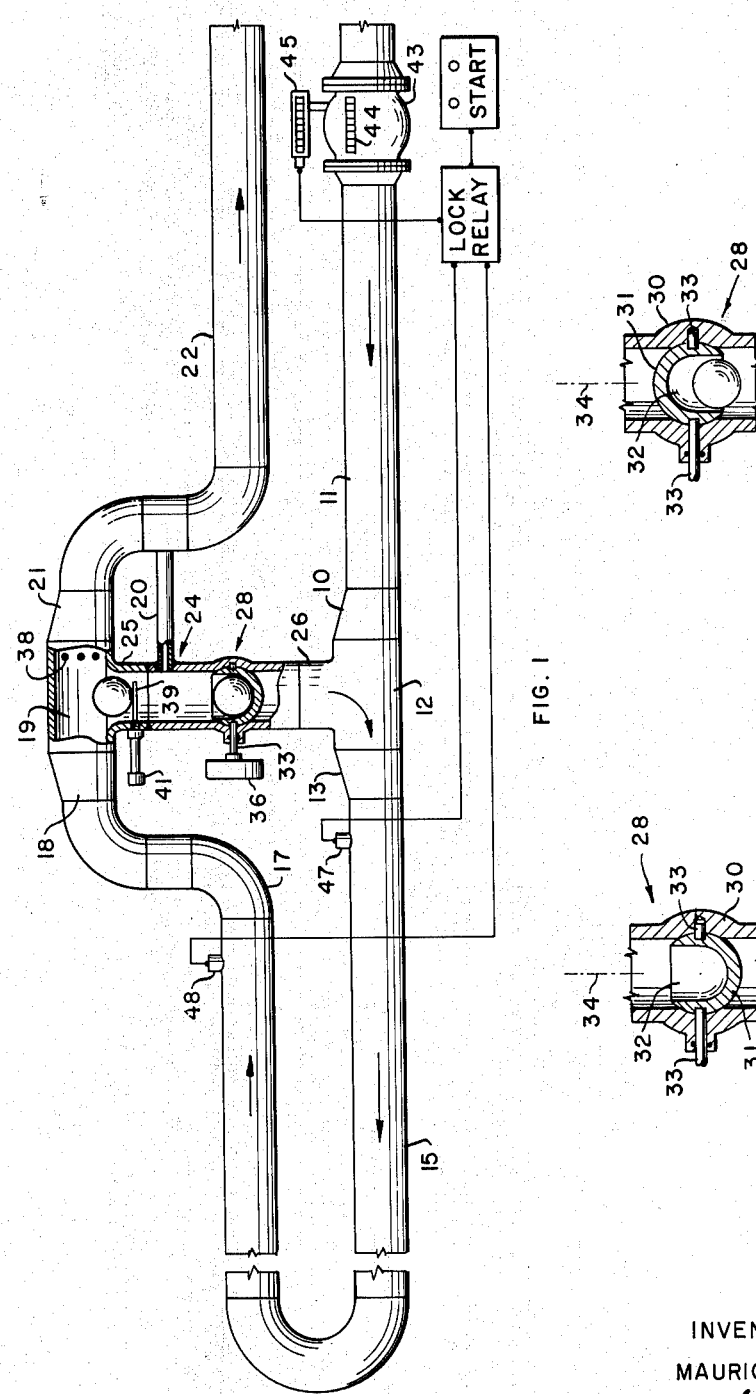
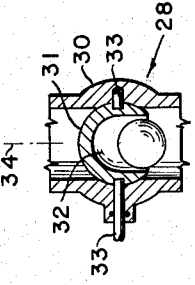
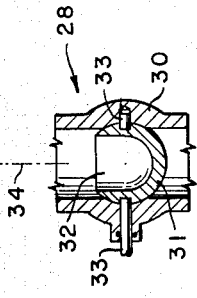
INVENTOR:
MAURICE L. BARRETT, JR
BY: James Todorovic
HIS ATTORNEY INVENTOR:
MAURICE L. BARRETT, JR.
BY: James Todorovic
HIS ATTORNEY

United States Patent Office

3,224,247
Patented Dec. 21, 1965

3,224,247
PROVING FLOWMETERS
Maurice L. Barrett, Jr., Zionsville, Ind., assignor to Shell Oil Company, New York, N.Y., a corporation of Delaware
Filed Aug. 11, 1961, Ser. No. 130,818
8 Claims. (Cl. 73—3)

This invention relates to the testing, calibrating or proving of flowmeters, and more particularly pertains to an apparatus and system for proving flowmeters of the differential, positive-displacement or turbine types, while said flowmeters are functioning to measure a stream flowing through a closed conduit, e.g., pipeline. In one of its more specific embodiments, the invention encompasses a flowmeter proving system which permits a "demand proof," i.e., calibration, of flowmeters without the necessity of interrupting flow of fluid therethrough during the repositioning of a scraper, elastomer spheroid or a like plug from the downstream end of the calibrating or meter-proving section to the upstream section or end thereof.

In the last decade, a technique was developed for the accurate and economical proving of flowmeters, this technique involving the propelling of a solid body, e.g., a plug, through a given section of conduit at the velocity of flow of the fluid through said conduit, initiating the registering operation of the flowmeter to be proved (which flowmeter is arranged in series with said conduit) by a signal produced by the arrival of said plug at a first predetermined point along the conduit, and stopping said registering operation by a signal produced by the arrival of the plug at a second predetermined point downstream of said first point along the conduit, thereby accomplishing the calibration or proving of said flowmeter. This proof may be made by a comparison between the flowmeter reading and the known volume within the pipe between the two signals.

A specific system of the above general class is described in the Plank et al. patent, U.S. 2,772,561. In this system, the liquid being transported through a conduit forces a scraper, spheroid, or a like solid object, which forms a moveable seal inside the conduit, through a section of said pipe which constitutes the meter-proving section. The flowmeter to be calibrated is usually disposed in said conduit either slightly upstream or downstream of said meter-proving section. At the beginning of said meter-proving section, there is provided an electro-mechanical switch which is tripped by the aforesaid plug. This closes an electric circuit, thereby actuating a supplementary or meter proving counter or register on the flowmeter under test to engage it to the meter. The electric circuit for this register, in one embodiment, remains closed while the spheroid or plug continues the course of the proving section of the pipe line until the plug reaches a position at the end of said section where said plug trips a second electro-mechanical switch which opens the electric circuit deactivating the supplementary counter on the flowmeter. Slightly downstream, the plug moves into and stops in a barrel which is usually of a slightly greater diameter than the pipe line, the liquid however moving on downstream into and through the remainder of the carrier conduit or pipe line to destination. As stated, the proof of the flowmeter may be made by a comparison of the flowmeter's supplementary counter reading with the precalibrated and known displaced volume of the conduit prover section between the aforesaid two tripping switches.

Although the above technique provides accurate proving of flowmeters without the necessity of large capital expenditures, e.g., for large volume tankage, the specific system outlined above has one disadvantage, namely, the inconvenience caused by the necessity of repositioning the plug from the point in the barrel where it comes to rest just beyond where it had caused the tripping of the second switch to a position just forward or upstream of the first switch. This requires the physical removal of the plug from the barrel (or the like) at the end of the meter proving section, and the manual reinsertion thereof into a barrel in the conduit at the forward end ahead of the first switch. Of course, such a procedure is costly, time-consuming, and frequently even hazardous, e.g., when the opening of the barrel to remove the plug or plugs causes spillage of combustible (e.g., hydrocarbon) or toxic products or the "flashing" of high vapor pressure liquids conveyed through the conduit.

Recently, a flowmeter proving system has been developed which avoids at least some of the above disadvantages. This system includes a continuous conduit circuit having a substantially horizontal conduit comprising the meter proving loop section, an ascending conduit section, and a descending conduit section connecting the upper end of the ascending section to the upstream end of the horizontal proving loop section. The descending conduit section is provided with openings to an inlet and an outlet line, a valve being disposed between these openings for causing full flow through the loop. The other ends of the inlet and outlet lines open into the main pipe line, a valve being likewise disposed in said line between these two branch lines to cause the fluid normally flowing through the pipe line to be by-passed into and through the loop when a flowmeter in the main carrier pipe line is to be proved. When this system is used to prove a flowmeter, the valve in the main pipe line (between the aforementioned lines leading to and from the descending conduit section) has to be closed. This closing of the valve in the main line every time it is desired to prove a meter therein tends to cause pressure variations, surges and flow rate disturbances which are seriously detrimental to a precision meter proof because of the necessity of overcoming the inertia of the liquid in the loop when flow is directed into the loop to start the movement of the plug therethrough. This is particularly true in the case or cases where a relatively viscous hydrocarbon is to be moved through the loop. Additionally, the proving of meters by the use of the system described in this paragraph has the added defect that it would not be practical, and is difficult to use, when the pipe line (having this loop system for meter calibration) is used for the transport of a multiplicity of liquids, e.g., such as is the case in products pipe line service. Since the loop in the above system is to be employed only when a meter is to be proved, and since, therefore, there is no flow through the loop at any time except when the plug is in a meter proving run, this loop (during such other times) is filled with the liquid which was being transported during the last meter proving operation. Obviously, this would tend to contribute to contamination in multi-liquid service since otherwise one would either have to drain the loop each time or wait until the same type of liquid is being transported before the next meter proving is attempted.

It is an object of the present invention to obviate the above and other defects of the prior art systems.

Another object of the present invention is to provide a meter proving or calibrating system having a new and improved design which will obviate the objections and defects of the known meter proving systems.

Still another object is to provide a meter proving system which permits repeated proving of one or more meters without contamination of the liquids transported through the pipe line even when said line is used in multi-liquid transport service.

A still further object is to provide a meter proving system which permits repeated consecutive proofs of one or a battery of several meters in parallel without having to stop or reroute the fluid flow through the system piping in order to effect the meter proof, thereby eliminating possible flow rate and pressure disturbances in the metered stream.

It has now been discovered that the above and other objects can be attained by providing a meter proving system in which a portion of the pipe line or transporting conduit itself is used as and is formed into a meter proving loop. This system includes a continuous return loop in the conduit normally transporting the metered fluid in such a way that the downstream portion of the looped circuit is made to return at a higher elevation than the upstream portion of the looped conduit and cross above the latter on at least one vertical line drawn between the upstream and downstream ends of the looped section. An interconnecting oversized vertically-disposed conduit communicates between the upstream and downstream ends of the looped section, the vertical communicating conduit being coincidental with the vertical line of intersection of the extremities of the loop. The flowmeter to be proved is preferably disposed in the transporting conduit, ahead of the proving loop and upstream of the vertical interconnecting conduit, to measure the fluid which passes into the looped section. The flowmeter may alternately be disposed downstream of the vertical interconnecting conduit, measuring the fluid which has passed through the looped section. However, from a practical standpoint, it is usually preferable to take advantage of the flowmeter's strainer or filter means to remove dirt and foreign material from the fluid before it passes through the loop. Effluent fluid from the meter proving loop is transported to destination through a conduit or pipe line which is a continuation of the looped section. Disposed respectively near the extremities of the looped section immediately adjacent to the vertical conduit connecting the upstream and downstream ends of the loop are two electrical switches or switching means actuated by the passage of a plug or spheroid across them in such a manner as to start a supplementary meter proving register when the upstream switch is activated and stop the supplementary register when the downstream switch is activated. The true volume of fluid which a spheroid or plug will displace from the loop in passing from the first electrical signal to the final electrical signal is predetermined and in subsequent meter proving, this volume is the true volume which will pass through the meter during the time it takes the plug or spheroid to pass through the prover section.

The extraction of the plug or spheroid from the flowing stream, and its transition or movement from the relatively low-pressure area at the end of the loop to the relatively higher pressure zone at the beginning of the loop is accomplished through the vertical oversized conduit between the two zones, this being further implemented by the configuration of the T fittings at the junctions of the vertical conduit with the extremities of the loop and by certain oversized valve means installed in the vertical conduit. This valving can be effected in several different ways. In one preferred embodiment, a special "ball" valve means containing a spherical core in a substantially spherical housing is disposed in the vertical conduit section; the spherical core is rotatable on an axis normal to the vertical conduit axis and is provided with a plug- or spheroid-receiving and retaining recess or cup. The bore of the recess or cup in the valve core is adapted to register with the bore of the pipe constituting the vertical conduit which, in the preferred embodiments, is normally one pipe size larger than the pipe size in the prover section. Such special valve means may be made by taking an ordinary commercially available ball valve (which has a substantially spherical core element rotatable in the valve housing on an axis normal to the pipe axis, which element has a bore therethrough adapted to register with the pipe bore in which the valve is installed), and having one end of said bore closed while leaving a space, recess or cup in the bore to receive the spheroid as it falls by gravity down through the vertical conduit and into the valve. After the spheroid or like plug, which may be of an elastomer, has passed through the portion of the looped section known as the meter prover section and performed its function of displacing the precalibrated and known volume of fluid between the two electrical, electronic or electro-mechanical sensing devices, the spheroid continues by the force of the liquid pressure to and into a short piece of relatively larger section of pipe, this larger section of pipe preferably being in the form of a T and having an outlet larger in diameter than the elastomer spheroid or plug and normal to it on a vertical line downward, such outlet being the connection between the vertical conduit and the downstream end of the looped transporting pipe line. The large section of pipe at this junction is equipped with steel bars at the downstream edge of the vertical conduit which prevents further travel of the spheroid through and into the transporting pipe line or it may be equipped with special baffle means to catch and trap the spheroid at the vertical conduit as it attempts to proceed through the oversized section. With the stream velocity having been sufficiently slowed down because of the oversized section of pipe, the spheroid falls by gravity vertically downward in the vertical conduit coming to rest in the recess in the rotatable core of the special ball valve. The liquid being pumped through the transporting pipe line continues to flow on. When it is desired to effect the next meter proof of the meter (or meters) in said pipe line, all that has to be done is to cause the rotation, through 180°, of the recess-containing spherical core of the valve, so that said recess now registers with the lower part or section of the vertical conduit. This permits the elastomer spheroid or like plug to drop into the last-mentioned section of the conduit where it continues to fall by gravity into an oversized portion of the pipe line at the upstream end of the looped section and is swept by fluid velocity into and through said looped meter prover section. At any desired time, the elastomer spheroid may be removed from the piping of this system by simply rotating the spherical core of the special valve through 90° from the recess-up position and taking the elastomer spheroid out through an opening, having a removable cover, in the side of the special valve. By a similar operation, a spheroid may be introduced into the system.

In another embodiment of the invention, the special spherical core valve described above is replaced by two common gate valves or standard ball valves having full through-conduit openings, or (in the alternative) by two power-actuated clapper-type check valves, all of which are well-known in the industry. Such valves are preferably used in a size at least one pipe size larger than that of the pipe comprising the prover loop. The run of a comparable sized T is disposed between these two valves in such a manner as to provide a means of removing or inserting the elastomer spheroid through a closure provided on the side outlet of the T. All other piping is as described above in connection with the description of the first embodiment. To effect a meter proof, and with the elastomer spheroid resting on top of the gate, core or flapper of the lower of the two valves, the upper valve is first closed and then the lower valve is opened, thus causing the spheroid to fall by gravity through it and into the flowing stream. After the spheroid has fallen, the lower valve is closed and then the upper valve is opened. In this way the spheroid, after it has made its trip around the looped section of conduit, is removed from the flowing stream and caused to return to its normal resting position on top of the gate of the closed lower valve. Alternately, the above sequence of valve opening and closing may be modified to cause the normal resting position of the elastomer spheroid to be on top of the gate or core of the upper valve if desired, wherein the upper valve is first opened, then closed and subsequently the lower valve is first opened and then closed and in so doing, the spheroid is transitioned from the downstream end of the looped section of carrier conduit to its upstream end.

A more complete understanding of the invention and of its advantages may be obtained from the following detailed description, taken together with the accompanying drawings in which:

FIGURE 1 is a diagrammatic or schematic view illustrating one embodiment of the meter proving apparatus of the present invention, together with suitable meter registration means;

FIGURE 2 is a schematic detail of the special spheroid-receiving and transmitting valve used in said first embodiment, said valve being shown in the position adapted to receive the ball or elastomeric spheroid after it has completed a cycle through the meter proving loop;

Figure 4:
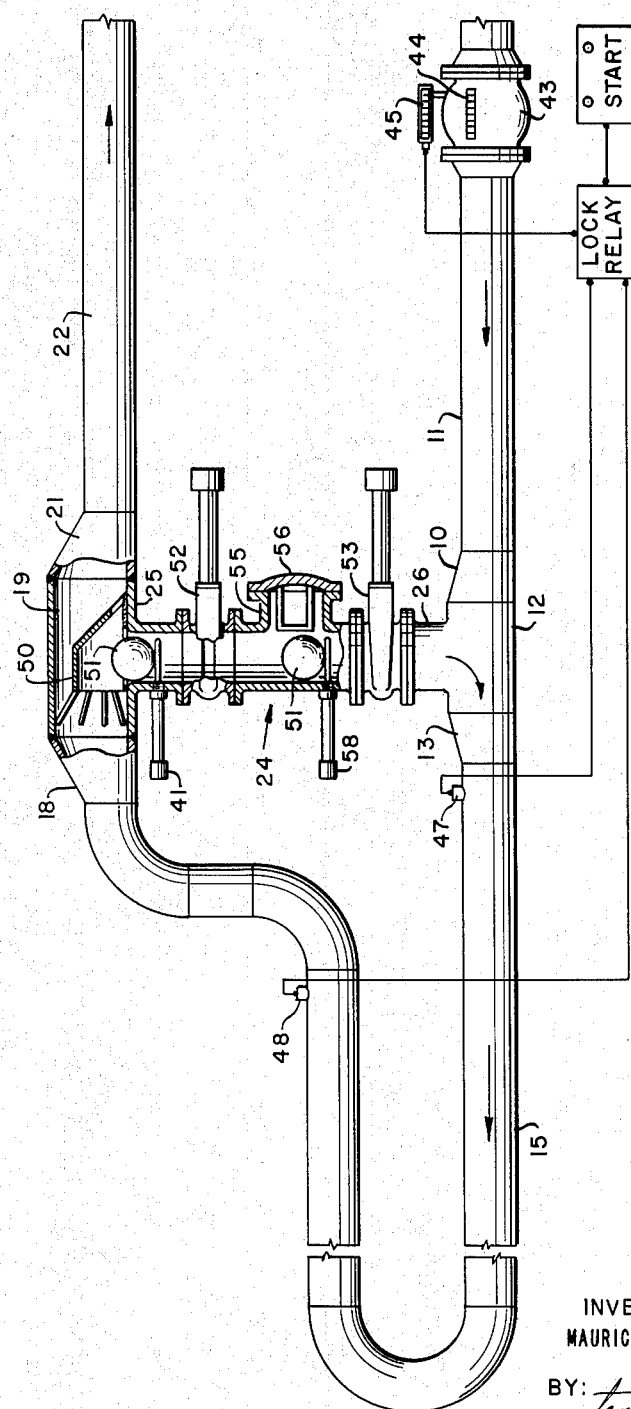

FIGURE 3 is a view of the same special valve disclosed in FIGURE 2, but shown in a position when it releases the elastomeric spheroid for the next passage through the calibrated loop section during the meter proving operation; and FIGURE 4 is a diagrammatic or schematic view illustrating a second embodiment of the meter proving apparatus of the present invention, together with suitable meter registration means, said second embodiment using ordinary valves instead of those shown in FIGURES 2 and 3.

Referring now to FIGURE 1, the looped meter prover section described herein is in communication at its upstream end 10 to the main pipe 11 by means of an oversized T 12. The downstream end 13 of this oversized T section communicates with the upstream end of a substantially horizontally disposed, looped conduit section 15 and 17. This latter section returns over and vertically above T 12, ascending portion 17 terminating at 18 in a T 19 of enlarged cross section. The end 21 of T 19 opposite to the end which is in communication with the aforementioned ascending portion 17 communicates with the downstream portion 22 of the main carrier pipe line.

A substantially vertically disposed conduit means or section 24 and valve 28, preferably of a diameter somewhat larger than that of the looped section 15, connects the outlets 25 and 26 of T's 19 and 12, respectively. At an intermediate point, this vertical conduit section 24 has a valve 28 more fully shown in FIGURES 3 and 4. This valve comprises or includes an outer housing 30, the two ends of which communicate with the interior of the vertical conduit 24 both above and below said valve. A rotatable valve member 31 in the shape of a sphere and recessed at 32 to receive the elastomer spheroid is adapted to rotate on shaft 33 along an axis normal to the vertical conduit axis 34. The rotation of shaft 33 and, therefore, of the recessed rotatable valve member element 31 may be affected by means 36.

The interior of the run of T 19 at a point near the downstream side of the vertical conduit 24 is provided with a steel grating or suitable steel bars 38 adapted to prevent the passage of the spheroid from conduit section 17 into the main carrier pipe line section 22, and in combination with the reduction of fluid velocity at this point, said spheroid is caused to fall into the upper part of the vertical conduit section 24.

Instead of using the bars 38, the spheroid may be deflected from the T 19 into the vertical conduit by means of a baffle insert shown in FIGURE 4. The disposing of this baffle insert in the enlarged portion of the T 19 just above the vertical conduit means permits the trapping of the plug or spheroid in an area of relatively quiescent fluid of relatively low velocity, thus causing the spheroid to fall downwardly by gravity into the vertical conduit section or means 24; this separates the ball from the main stream of flowing fluid.

A plunger pin 41 is shown in FIGURE 1, as protruding inwardly into T 19 in the upper part of the vertical conduit passage. Although not essential to the functioning of the meter prover system of the present invention, this pin 41 holds up the spheroid in T 19 in such a position as to allow circulation of the flowing liquid over and around it, thus assuring that the temperature of the elastomer spheroid is maintained at or near the temperature of the flowing fluid. This is frequently desirable, if not necessary from a practical standpoint, particularly where the spheroid is made of a material or materials which harden excessively when subjected to cold environmental temperatures, such as might be experienced at times if the spheroid were to be allowed to rest in the recess 32 of valve 28 during periods of non-use of the system during extremely cold atmospheric temperature conditions.

In order to effect the removal or insertion of the elastomer spheroid in the meter proving loop, the recessed rotatable valve member 31 of valve 28 is rotated by means 36 through shaft 33 to such a position that the open end of its recess is normal to the axis of the vertical conduit 24 and in line with the side outlet (not shown in FIGURE 1). In this position, the ingress of liquid from both the upstream and downstream ends of the loop to the recess of the valve is prevented and the elastomer spheroid or plug may be removed or inserted by removal of a closure plate on said outlet.

Flowmeter 43 of FIGURE 1 is provided with a register 44 and an auxiliary or supplementary meter proving register 45 which latter is operatively connected to or disconnected from the flowmeter 43 by the operations of the lock relay actuated by signals transmitted thereto by signal devices or spheroid detectors 47 and 48 disposed in pipe line 15.

The operation of the system described will be readily apparent to those skilled in the art: Thus, it will be readily understood that flowmeter 43 in pipeline 11 may be proved at any time by causing the elastomer spheroid to pass through the meter proving section 15 of the pipe line, the extremities of which section are bounded by spheroid detectors 47 and 48. At the end of this passage the elastomer ball is caught in T 19 at the downstream end of the loop. The spheroid then falls by gravity into the recess 32 of valve 28. The rotation of the valve core 180° until the cupped-type recess is reversed causes the spheroid to spill out of the recess and to fall by gravity downwardly through the oversized pipe of the vertical conduit means. This returns the spheroid into the upstream portion of the meter prover loop in T 12, whereupon the fluid stream can again push the spheroid through the meter prover loop.

Since the volume of the pipe section 15 between detectors 47 and 48 has been previously accurately determined, and since the auxiliary proving register 45 is actuated by the tripping of detector 47 (and stops when the spheroid passes detector 48), the difference between the reading thus shown by the register 45 and the aforementioned known volume of the pipe between detectors 47 and 48, permit the proving of the meter.

Reference is now made to FIGURE 4, which, as indicated further above, shows diagrammatically a second embodiment of a meter-proving apparatus of the present invention. In this FIGURE 4, elements which are the same as those in FIGURE 1 have been indicated by the same numbers as applied in the last-mentioned figure. An examination of FIGURE 4 makes it clear that its meter-proving loop is very similar to that of FIGURE 1 and differs from the latter primarily in two aspects. In the first place, FIGURE 4, instead of the bars 38 in T 19, shows a baffle insert 50. As stated further above, the disposing of this baffle insert 50 in the enlarged portion of T 19 just above the vertical conduit means 24 permits the trapping of the plug or spheroid 51 in an area of relatively quiescent fluid of relatively low velocity, thus causing the spheroid 51 to fall downwardly by gravity until it is stopped by plunger pin 41. The vertical conduit means 24 of FIGURE 4, besides the plunger pin 41, includes the following elements: two standard-type through-the-conduit gate valves 52 and 53, and a T connection 55 having its side outlet covered by a closure plate 56, said T connection 55 being disposed between said valves 52 and 53. A plunger pin 58, located in the vertical conduit means 24, is positioned just below the T connection 55 so that when pin 58 is inserted or pushed into the vertical conduit 24, the spheroid falling therethrough will be stopped by said pin in such position that it may be readily removed from the system through the side opening in T 55 after the closure plate 56 has been removed therefrom.

To effect the proving of meter 43 in the system shown in FIGURE 4, and assuming that the spheroid 51 is disposed on top of the gate valve 53 which at the moment is in the closed position, it will be first necessary to close valve 52 and open valve 53. This causes the spheroid to fall by gravity through said valve 53 and into the stream of liquid (e.g., hydrocarbon) flowing through T 12. The spheroid is then washed around the meter prover loop by the liquid stream until the spheroid reaches T 19 where it is removed from the flowing fluid by baffle 50; the spheroid then falls by gravity onto the closed gate of valve 52. In its passage through the loop, the spheroid trips detectors 48 and thus causes counter 45 to prove meter 43 in the manner described above and in the Plank et al. patent, U.S. 2,772,561.

In order to reposition the spheroid 51 for further meter proving, valve 53 is closed, while valve 52 is reopened. This causes the elastomer spheroid to fall to its starting position on top of the gate of valve 53. As indicated, valves 52 and 53, as well as plunger pins 41 and 58, may be operated manually. However, it is preferred to provide them with some type of power-operated driving means (not shown) whereby the sequence of operations of the equipment may be preprogrammed, for example, by means of a power-operated controller, which is brought into operation, for instance, by a manual actuaton of an electrical starting switch.

As pointed out above, in order that the elastomeric spheroid may fall down into the vertical section 24, the T 19 must have a somewhat larger cross-section than that of the pipes, e.g., pipe 15 constituting the meter-prover section. In the alternative, the same result may be attained by providing a by-pass, e.g., by-pass 20 of FIGURE 1. Both of these procedures will slow down the velocity of the liquid flowing through the system, and thus permit the spheroid to fall down into vertical conduit means 24.

Instead of using an electro-mechanical scheme for registering, it is also possible to use pulse-generating tachometers, e.g., of the type described in the Pfrehm article appearing on page 100 of the September 28, 1959, issue of The Oil and Gas Journal. This type of an electronic tachometer is gated (just as in the drawings attached hereto) to two detectors or signal actuators. Some meters do not use supplementary tachometers, but generate their own pulses. This is true, for example, with turbine type meters. These meters may be used upstream or downstream of the loop.

From the foregoing, it is believed that the present invention may be readily understood by those skilled in the art without further description, it being borne in mind that numerous changes may be made in the details disclosed without departing from the spirit of the invention as set forth in the following claims.

I claim as my invention:

1. An apparatus for calibrating or proving liquid flowmeters of the indicating type located in a pipe line, which comprises a continuous loop forming an integral part of said pipe line for the continuous and uninterrupted flow of liquid through the loop, said pipe line loop including two substantially vertically displaced parts, substantially vertical by-pass conduit means interconnecting said vertically displaced parts, plug means movable through said pipe line loop in sealing engagement therewith and through said by-pass conduit means, flow-control means in said by-pass conduit means for controlling the passage of said plug means through said by-pass conduit means and permitting passage therethrough from said upper part to said lower part while obstructing the flow of liquid in the opposite direction, whereby said plug means can be controllably transferred from said upper part to said lower part without interrupting the flow of liquid through said pipe line loop, and a pair of sensing means disposed in said pipe line loop in spaced relation, whereby the travel of the plug means past sensing means will be indicated.

2. Apparatus as defined in claim 1 wherein said downstream part of the pipe line loop extends along a substantially straight line both upstream and downstream from the junction thereof with the by-pass conduit means and contains plug-stopping means extending across the bore of the said part of the loop at said junction for deflecting said plug means into the by-pass conduit means.

3. In combination with apparatus as defined in claim 1, retractible retaining means within the said by-pass conduit means positioned to retain said plug means in position such as to be in contact with the fluid flowing through said upper part of the pipe line loop.

4. Apparatus as defined in claim 1 wherein said upper part of the pipe line loop is situated above the lower part and includes at the junction thereof with the upper end of said by-pass conduit means a part having a substantially horizontal axis, said horizontal part having a bore diameter substantially in excess of that of the plug means, whereby the flow velocity through said horizontal part is lower than in other parts of the pipe line loop.

5. In combination with apparatus as defined in claim 1, an auxiliary by-pass conduit interconnecting the bore of said first-mentioned by-pass conduit means to a point in said pipe line near and downstream from the junction of the upper part of the pipe line loop with the first-mentioned by-pass conduti means, for the flow of fluid in contact with the plug means.

6. Apparatus as defined in claim 1 wherein said lower and upper parts of said pipe line loop are connected to said pipe line in linear, coaxial relationships for the direct, continuous flow of fluid.

7. Apparatus as defined in claim 1 wherein said flow-control means includes a rotatable valve member which is shaped to fully obstruct the passage through said by-pass conduit means, said valve member containing a chamber of a size capable of receiving and containing said plug means, said valve member being rotatable through an angle sufficient to transfer said plug means from the upper section to the lower section of said by-pass conduit means.

8. Apparatus as defined in claim 1 wherein said flow control means includes two independently operable valve means disposed in vertically spaced relation sufficiently far apart to permit said plug means to be positioned therebetween within the bore of the by-pass conduit means, each said valve means providing an opening in registry with said bore to permit free fall of the plug means therethrough when the respective valve means is in open position, whereby sequential opening and closing of the upper and lower valve means permits the plug means to fall from said upper part of the loop to said lower part without the upward flow of liquid through the by-pass conduit means.

References Cited by the Examiner

UNITED STATES PATENTS

| | | | |
|---|---|---|---|
| 914,824 | 3/1909 | Greenan | 15—104.06 |
| 973,794 | 10/1910 | Lightcap | 15—104.06 |
| 2,705,576 | 4/1955 | Amelio et al. | 221—226 |
| 2,772,561 | 12/1956 | Plank et al. | 73—3 |
| 2,786,219 | 3/1957 | Meyer | 15—104.06 |
| 2,796,878 | 6/1957 | Atkinson et al. | 15—104.06 |
| 2,948,144 | 8/1960 | Applequist | 73—3 |
| 2,953,157 | 9/1960 | Osborne et al. | 15—104.06 |
| 2,977,616 | 4/1961 | Willis | 15—104.06 |

FOREIGN PATENTS 8,950    1894    Great Britain.

ISAAC LISANN, *Primary Examiner.*

LOUIS R. PRINCE, *Examiner.*